US008898217B2

(12) United States Patent
Grigorovici et al.

(10) Patent No.: US 8,898,217 B2
(45) Date of Patent: Nov. 25, 2014

(54) CONTENT DELIVERY BASED ON USER TERMINAL EVENTS

(75) Inventors: Dan Marius Grigorovici, Pleasanton, CA (US); Omar Abdala, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 12/774,918

(22) Filed: May 6, 2010

(65) Prior Publication Data

US 2011/0276615 A1 Nov. 10, 2011

(51) Int. Cl.
*G06F 15/16* (2006.01)
*G06F 17/00* (2006.01)
*G06F 17/30* (2006.01)
*G06Q 30/02* (2012.01)

(52) U.S. Cl.
CPC .......... *G06Q 30/02* (2013.01); *G06F 17/30867* (2013.01)
USPC .............................. 709/201; 709/203; 706/46

(58) Field of Classification Search
CPC . G06Q 30/02; H04N 21/4532; H04N 21/482; H04N 21/25891; H04N 21/47815
See application file for complete search history.

(56) References Cited

U.S. PATENT DOCUMENTS

| 5,408,519 A | 4/1995 | Pierce et al. |
| 5,459,306 A | 10/1995 | Stein et al. |
| 5,600,364 A | 2/1997 | Hendricks et al. |
| 5,613,213 A | 3/1997 | Naddell et al. |
| 5,678,179 A | 10/1997 | Turcotte et al. |
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |
| 6,023,700 A | 2/2000 | Owens et al. |
| 6,055,512 A | 4/2000 | Dean et al. |

(Continued)

FOREIGN PATENT DOCUMENTS

| BE | 1015704 | 7/2005 |
| DE | 19941461 | 3/2001 |

(Continued)

OTHER PUBLICATIONS

"International Search Report and Written Opinion mailed on Aug. 26, 2011 for PCT/US2011/034927 titled "Content Delivery Based on User Terminal Events," to Apple Inc".

(Continued)

*Primary Examiner* — Peling Shaw
(74) *Attorney, Agent, or Firm* — Novak Druce Connolly Bove + Quigg LLP

(57) ABSTRACT

Systems and methods are provided for selecting content based on user interactions with content previously presented to a user but failing to generate a conversion. In operation, a content delivery system delivers a content package to a user terminal, where the content package includes a content designed to elicit a pre-defined response, such as a conversion. The user terminal then presents the content to a user and generates a journal of events occurring in response to the content package. The journal is then used to determine the proximity of the events in the journal to the pre-defined response. If the degree of proximity to the desired response is high, the user is likely prepared to complete the conversion and therefore a same or similar content can be selected for the user terminal. Otherwise, new content can be delivered to the user terminal.

29 Claims, 6 Drawing Sheets

(56) References Cited

U.S. PATENT DOCUMENTS

| | | | |
|---|---|---|---|
| 6,055,513 A | 4/2000 | Katz et al. |
| 6,057,872 A | 5/2000 | Candelore |
| 6,097,942 A | 8/2000 | Laiho |
| 6,253,189 B1 | 6/2001 | Feezell et al. |
| 6,286,005 B1 | 9/2001 | Cannon |
| 6,334,145 B1 | 12/2001 | Adams et al. |
| 6,338,044 B1 | 1/2002 | Cook et al. |
| 6,345,279 B1 | 2/2002 | Li et al. |
| 6,381,465 B1 | 4/2002 | Chern et al. |
| 6,393,407 B1* | 5/2002 | Middleton et al. ......... 705/14.73 |
| 6,405,243 B1 | 6/2002 | Nielsen |
| 6,408,309 B1 | 6/2002 | Agarwal |
| 6,446,261 B1 | 9/2002 | Rosser |
| 6,502,076 B1 | 12/2002 | Smith |
| 6,684,249 B1 | 1/2004 | Frerichs et al. |
| 6,690,394 B1 | 2/2004 | Harui |
| 6,698,020 B1 | 2/2004 | Zigmond et al. |
| 6,718,551 B1 | 4/2004 | Swix et al. |
| 6,738,978 B1 | 5/2004 | Hendricks et al. |
| 6,795,808 B1 | 9/2004 | Strubbe et al. |
| 6,886,000 B1 | 4/2005 | Aggarwal et al. |
| 6,920,326 B2 | 7/2005 | Agarwal et al. |
| 6,990,462 B1 | 1/2006 | Wilcox et al. |
| 7,039,599 B2 | 5/2006 | Merriman et al. |
| 7,072,947 B1 | 7/2006 | Knox et al. |
| 7,149,537 B1 | 12/2006 | Kupsh et al. |
| 7,168,084 B1 | 1/2007 | Hendricks et al. |
| 7,203,684 B2 | 4/2007 | Carobus et al. |
| 7,280,818 B2 | 10/2007 | Clayton |
| 7,356,477 B1 | 4/2008 | Allan et al. |
| 7,370,002 B2 | 5/2008 | Heckerman et al. |
| 7,506,355 B2* | 3/2009 | Ludvig et al. ................. 725/112 |
| 7,539,652 B2 | 5/2009 | Flinn et al. |
| 7,558,559 B2 | 7/2009 | Alston |
| 7,669,212 B2 | 2/2010 | Alao et al. |
| 7,685,019 B2 | 3/2010 | Collins |
| 7,730,017 B2 | 6/2010 | Nance et al. |
| 7,734,632 B2 | 6/2010 | Wang |
| 7,747,676 B1 | 6/2010 | Nayfeh et al. |
| 7,870,576 B2 | 1/2011 | Eldering |
| 7,882,518 B2 | 2/2011 | Finseth et al. |
| 7,903,099 B2 | 3/2011 | Baluja |
| 7,912,843 B2 | 3/2011 | Murdock et al. |
| 7,921,069 B2* | 4/2011 | Canny et al. ................... 706/47 |
| 7,984,014 B2 | 7/2011 | Song et al. |
| 8,046,797 B2 | 10/2011 | Bentolila et al. |
| 8,060,406 B2 | 11/2011 | Blegen |
| 8,191,098 B2 | 5/2012 | Cooper et al. |
| 8,196,166 B2 | 6/2012 | Roberts et al. |
| 8,229,786 B2 | 7/2012 | Cetin et al. |
| 8,380,562 B2 | 2/2013 | Toebes et al. |
| 2001/0044739 A1 | 11/2001 | Bensemana |
| 2001/0047272 A1 | 11/2001 | Frietas et al. |
| 2001/0051925 A1 | 12/2001 | Kang |
| 2002/0006803 A1 | 1/2002 | Mendiola et al. |
| 2002/0016736 A1 | 2/2002 | Cannon et al. |
| 2002/0019829 A1 | 2/2002 | Shapiro |
| 2002/0021809 A1 | 2/2002 | Salo et al. |
| 2002/0052781 A1 | 5/2002 | Aufricht et al. |
| 2002/0075305 A1 | 6/2002 | Beaton et al. |
| 2002/0077130 A1 | 6/2002 | Owensby |
| 2002/0078147 A1 | 6/2002 | Bouthors et al. |
| 2002/0083411 A1 | 6/2002 | Bouthors et al. |
| 2002/0099842 A1 | 7/2002 | Jennings et al. |
| 2002/0120498 A1 | 8/2002 | Gordon et al. |
| 2002/0137507 A1 | 9/2002 | Winkler |
| 2002/0138291 A1 | 9/2002 | Vaidyanathan et al. |
| 2002/0161770 A1 | 10/2002 | Shapiro et al. |
| 2002/0164977 A1 | 11/2002 | Link II et al. |
| 2002/0165773 A1 | 11/2002 | Natsuno et al. |
| 2002/0175935 A1 | 11/2002 | Wang et al. |
| 2003/0003935 A1 | 1/2003 | Vesikivi et al. |
| 2003/0023489 A1 | 1/2003 | McGuire et al. |
| 2003/0040297 A1 | 2/2003 | Pecen et al. |
| 2003/0083931 A1 | 5/2003 | Lang |
| 2003/0101454 A1 | 5/2003 | Ozer et al. |
| 2003/0126015 A1 | 7/2003 | Chan et al. |
| 2003/0126146 A1 | 7/2003 | Van Der Riet |
| 2003/0130887 A1 | 7/2003 | Nathaniel |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0003398 A1 | 1/2004 | Donian et al. |
| 2004/0043777 A1 | 3/2004 | Brouwer et al. |
| 2004/0045029 A1 | 3/2004 | Matsuura |
| 2004/0054576 A1 | 3/2004 | Kanerva et al. |
| 2004/0068435 A1 | 4/2004 | Braunzell |
| 2004/0133480 A1 | 7/2004 | Domes |
| 2004/0136358 A1 | 7/2004 | Hind et al. |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0259526 A1 | 12/2004 | Goris et al. |
| 2005/0010641 A1 | 1/2005 | Staack |
| 2005/0021397 A1 | 1/2005 | Cui et al. |
| 2005/0060425 A1 | 3/2005 | Yeh et al. |
| 2005/0071224 A1 | 3/2005 | Fikes et al. |
| 2005/0075929 A1 | 4/2005 | Wolinsky et al. |
| 2005/0125397 A1 | 6/2005 | Gross et al. |
| 2005/0138140 A1 | 6/2005 | Wen et al. |
| 2005/0228680 A1 | 10/2005 | Malik |
| 2005/0228797 A1 | 10/2005 | Koningstein et al. |
| 2005/0229209 A1 | 10/2005 | Hildebolt et al. |
| 2005/0239495 A1 | 10/2005 | Bayne |
| 2005/0239504 A1 | 10/2005 | Ishii et al. |
| 2005/0249216 A1 | 11/2005 | Jones |
| 2005/0267798 A1 | 12/2005 | Panara |
| 2005/0273465 A1 | 12/2005 | Kimura |
| 2005/0273833 A1 | 12/2005 | Soinio |
| 2005/0289113 A1 | 12/2005 | Bookstaff |
| 2006/0031327 A1 | 2/2006 | Kredo |
| 2006/0040642 A1 | 2/2006 | Boris et al. |
| 2006/0048059 A1 | 3/2006 | Etkin |
| 2006/0059133 A1 | 3/2006 | Moritani |
| 2006/0068845 A1 | 3/2006 | Muller et al. |
| 2006/0075425 A1 | 4/2006 | Koch et al. |
| 2006/0095511 A1 | 5/2006 | Munarriz et al. |
| 2006/0117378 A1 | 6/2006 | Tam et al. |
| 2006/0123014 A1 | 6/2006 | Ng |
| 2006/0129455 A1 | 6/2006 | Shah |
| 2006/0141923 A1 | 6/2006 | Goss |
| 2006/0161520 A1 | 7/2006 | Brewer et al. |
| 2006/0167747 A1 | 7/2006 | Goodman et al. |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0276170 A1 | 12/2006 | Radhakrishnan et al. |
| 2006/0276213 A1 | 12/2006 | Gottschalk et al. |
| 2006/0282319 A1 | 12/2006 | Maggio |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0011344 A1 | 1/2007 | Paka et al. |
| 2007/0016743 A1 | 1/2007 | Jevans |
| 2007/0022021 A1 | 1/2007 | Walker et al. |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0067215 A1 | 3/2007 | Agarwal et al. |
| 2007/0072631 A1 | 3/2007 | Mock et al. |

(56) References Cited

U.S. PATENT DOCUMENTS

| | | |
|---|---|---|
| 2007/0074262 A1 | 3/2007 | Kikkoji et al. |
| 2007/0078712 A1 | 4/2007 | Ott et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0156534 A1 | 7/2007 | Lerner et al. |
| 2007/0180147 A1 | 8/2007 | Leigh |
| 2007/0192409 A1 | 8/2007 | Kleinstern et al. |
| 2007/0198485 A1 | 8/2007 | Ramer et al. |
| 2007/0208619 A1 | 9/2007 | Branam et al. |
| 2007/0214470 A1 | 9/2007 | Glasgow et al. |
| 2007/0233671 A1 | 10/2007 | Oztekin et al. |
| 2007/0244750 A1 | 10/2007 | Grannan et al. |
| 2007/0260624 A1* | 11/2007 | Chung et al. ............. 707/101 |
| 2007/0288950 A1 | 12/2007 | Downey et al. |
| 2007/0290787 A1 | 12/2007 | Fiatal et al. |
| 2007/0300263 A1 | 12/2007 | Barton et al. |
| 2008/0004046 A1 | 1/2008 | Mumick et al. |
| 2008/0004958 A1 | 1/2008 | Ralph et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0040175 A1 | 2/2008 | Dellovo |
| 2008/0052158 A1 | 2/2008 | Ferro et al. |
| 2008/0057947 A1* | 3/2008 | Marolia et al. ............. 455/425 |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082686 A1 | 4/2008 | Schmidt et al. |
| 2008/0091796 A1 | 4/2008 | Story |
| 2008/0133344 A1 | 6/2008 | Hyder et al. |
| 2008/0140508 A1 | 6/2008 | Anand et al. |
| 2008/0228568 A1 | 9/2008 | Williams et al. |
| 2008/0243619 A1 | 10/2008 | Sharman et al. |
| 2008/0249832 A1 | 10/2008 | Richardson et al. |
| 2008/0262927 A1 | 10/2008 | Kanayama et al. |
| 2008/0271068 A1 | 10/2008 | Ou et al. |
| 2008/0281606 A1 | 11/2008 | Kitts et al. |
| 2008/0288476 A1 | 11/2008 | Kim et al. |
| 2008/0319836 A1 | 12/2008 | Aaltonen et al. |
| 2009/0006194 A1 | 1/2009 | Sridharan et al. |
| 2009/0029721 A1 | 1/2009 | Doraswamy |
| 2009/0049090 A1 | 2/2009 | Shenfield et al. |
| 2009/0063249 A1 | 3/2009 | Tomlin et al. |
| 2009/0106111 A1 | 4/2009 | Walk et al. |
| 2009/0125377 A1 | 5/2009 | Somji et al. |
| 2009/0132395 A1 | 5/2009 | Lam et al. |
| 2009/0138304 A1 | 5/2009 | Aharoni et al. |
| 2009/0197619 A1 | 8/2009 | Colligan et al. |
| 2009/0216847 A1 | 8/2009 | Krishnaswamy et al. |
| 2009/0240677 A1 | 9/2009 | Parekh et al. |
| 2009/0275315 A1 | 11/2009 | Alston |
| 2009/0286520 A1 | 11/2009 | Nielsen et al. |
| 2009/0298483 A1 | 12/2009 | Bratu et al. |
| 2010/0030647 A1 | 2/2010 | Shahshahani |
| 2010/0082397 A1 | 4/2010 | Blegen |
| 2010/0082423 A1 | 4/2010 | Nag et al. |
| 2010/0088152 A1 | 4/2010 | Bennett |
| 2010/0114654 A1 | 5/2010 | Lukose et al. |
| 2010/0125505 A1 | 5/2010 | Puttaswamy |
| 2010/0138271 A1 | 6/2010 | Henkin |
| 2010/0153216 A1 | 6/2010 | Liang et al. |
| 2010/0161424 A1 | 6/2010 | Sylvain |
| 2010/0169157 A1 | 7/2010 | Muhonen et al. |
| 2010/0169176 A1 | 7/2010 | Turakhia |
| 2011/0106840 A1 | 5/2011 | Barrett et al. |
| 2011/0209067 A1 | 8/2011 | Bogess et al. |
| 2011/0276401 A1 | 11/2011 | Knowles et al. |

FOREIGN PATENT DOCUMENTS

| | | |
|---|---|---|
| DE | 10061984 | 6/2002 |
| EP | 1061465 | 12/2000 |
| EP | 1073293 | 1/2001 |
| EP | 1107137 | 6/2001 |
| EP | 1109371 | 6/2001 |
| EP | 1220132 | 7/2002 |
| EP | 1239392 | 9/2002 |
| EP | 1280087 | 1/2003 |
| EP | 1365604 | 11/2003 |
| EP | 1408705 | 4/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2343051 | 4/2000 |
| GB | 2369218 | 5/2002 |
| GB | 2372867 | 9/2002 |
| GB | 2406996 | 4/2005 |
| GB | 2414621 | 11/2005 |
| GB | 2424546 | 9/2006 |
| JP | 2002140272 | 5/2002 |
| JP | 2007199821 | 8/2007 |
| KR | 20060011760 | 7/2004 |
| WO | 96/24213 | 8/1996 |
| WO | 98/21713 | 5/1998 |
| WO | 00/00916 | 1/2000 |
| WO | 00/30002 | 5/2000 |
| WO | 00/44151 | 7/2000 |
| WO | 01/22748 | 3/2001 |
| WO | 01/31497 | 5/2001 |
| WO | 01/44977 | 6/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/91400 | 11/2001 |
| WO | 01/93551 | 12/2001 |
| WO | 01/97539 | 12/2001 |
| WO | 02/09431 | 1/2002 |
| WO | 02/31624 | 4/2002 |
| WO | 02/44989 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/096056 | 11/2002 |
| WO | 03/015430 | 2/2003 |
| WO | 03/019845 | 3/2003 |
| WO | 03/024136 | 3/2003 |
| WO | 03/049461 | 6/2003 |
| WO | 03/088690 | 10/2003 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/020578 | 3/2005 |
| WO | 2005/029769 | 3/2005 |
| WO | 2005/073863 | 8/2005 |
| WO | 2005/076650 | 8/2005 |
| WO | 2006/002869 | 1/2006 |

(56) References Cited

FOREIGN PATENT DOCUMENTS

| | | |
|---|---|---|
| WO | 2006/005010 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/093284 | 9/2006 |
| WO | 2006/119481 | 11/2006 |
| WO | 2007/001118 | 1/2007 |
| WO | 2007/002025 | 1/2007 |
| WO | 2007/087138 | 4/2007 |
| WO | 2007/091089 | 4/2007 |
| WO | 2007/060451 | 5/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/009507 | 1/2009 |
| WO | 2009032856 A2 | 3/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.

"Combined Search and Examination Report", for United Kingdom Patent Application No. GB 0816228.1 dated Jan. 2009, Jan. 6, 2009.

"Combined Search and Examination Report dated Mar. 7, 2008", for United Kingdom Patent Application No. GB 0721863.9, Mar. 7, 2008.

"Communication (Combined Search and Examination Report under Sections 17 and 18(3)) dated Jan. 30, 2009 issued from the United Kingdom Patent Office", in related United Kingdom Application No. GB.0818145.5 (8 pages), Jan. 30, 2009.

"Communication (European Search Report) dated Jun. 26, 2008", in European Patent Application No. EP 08101394, Jun. 26, 2008.

"Communication (European Search Report) dated Oct. 17, 2008 issued by the European Patent Office", in counterpart European Patent Application EP 08156763, Oct. 17, 2008.

"Communication (International Search Report along with Written Opinion of International Searching Authority) mailed Oct. 8, 2008 issued by the International Searching Authority", in counterpart International Application PCT/EP 2008/056342, Oct. 8, 2008.

"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages), Sep. 24, 2009.

"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.

"Communication Pursuant to Article 94(3) EPC (European Examination.Report) dated Oct. 23, 2008", issued in counterpart European Patent Application No. EP 08101394.8-1238, Oct. 23, 2008.

"Examination Report", for counterpart European Patent Applicaiton No. 08153257.4 issued Jun. 2, 2009.

"Examination Report dated Nov. 9, 2009", for European Patent Application No. EP 08159355.0, Sep. 11, 2009.

"Examination Report dated Jun. 17, 2009", issued in counterpart U.K. Application No. GB 0803273.2 by U.K. Intellectual Property Office (4 pages).

"International Preliminary Report on Patentability and Written Opinion issued Nov. 24, 2009", in International Application PCT/EP2008/056342 (7 pages), Nov. 24, 2009.

"International Search Report", for International Application No. PCT/FI 2006/050455, dated Jul. 25, 2007.

"International Search Report and Written Opinion of the International Search Authority mailed Jun. 19, 2009", for International Application No. PCT/EP 2008/056069, Jun. 19, 2009.

"International Search Report and Written Opinion of the International Searching Authority mailed Feb. 11, 2009, issued by the International Searching Authority", in related International Application PCT/EP 2008/063839 (11 pages).

"International Search Report mailed Mar. 24, 2009", in related PCT International Application No. PCT/EP 2008/063326 (4 pages), Mar. 24, 2009.

"Notice of Allowance dated Apr. 29, 2011", U.S. Appl. No. 11/888,680, Apr. 29, 2011, 10 pages.

"Office Action dated Mar. 31, 2011 issue by the U.S. Patent Office", in related U.S. Appl. No. 12/080,124 (29 pages), Mar. 31, 2011.

"Office Action issued from the USPTO dated Aug. 20, 2009", issued in related U.S. Appl. No. 12/075,593 (14 pages), Aug. 20, 2009.

"Office Action issued Mar. 17, 2010", in related U.S. Appl. No. 12/075,593 (11 pages), Mar. 17, 2010.

"Office Action Issued Oct. 15, 2010 by the U.S. Patent Office", in related U.S. Appl. No. 12/080,124 (28 pages), Oct. 15, 2010.

"Search Report under Section 17 dated Jul. 7, 2008", in related U.K. Application GB 0803273.2.

"U.K. Search Report under Section 17 dated Oct. 23, 2007", in U.K. Application No. 0712280.7, Oct. 23, 2007.

"Written Opinion of the International Searching Authority mailed Mar. 24, 2009 issued from the International Searching Authority", in related PCT International Application No. PCT/EP 2008/063326 (5 pages), Mar. 24, 2009.

"XP002456252—Statement in Accordance with the Notice from the European Patent Office dated Oct. 1, 2007", concerning business methods (OJ Nov. 2007; p. 592-593), Nov. 1, 2007, 592-593.

Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.

Internet Reference, "Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Mueller, Milton, "Telecommunication Access in Age of Electronic Commerce: Toward a Third-Generation Service Policy", Nov. 1996, HeinOnline, 49. Fed. Comm L.J., Nov. 1, 1996, 655-665.

Perkins, Ed, "When to buy airfare", http://www.smartertrael.com/travel-advice/when-to-buy-airfare.html?id=1628038, Nov. 21, 2006 (4 pages), Nov. 21, 2006.

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

(56) References Cited

OTHER PUBLICATIONS

"AdWords Reference Guide", Google, 2004.
Ghose, Anindya et al., "An Empirical Analysis of Search Engine Advertising: Sponsored Search in Electronic Markets", Management Science, Informs, 2009.
Karuga, Gilber G. et al., "AdPalette: An Algorithm for Customizing Online Advertisements on the Fly", Decision Support Systems, vol. 32, 2001.
Science Dictionary, Definition of "dynamic", 2002.
World English Dictionary, , Definition of "relevant", 1998.

* cited by examiner

CONTENT DELIVERY BASED ON USER TERMINAL EVENTS

FIELD

The following relates to content delivery and more specifically relates to systems and methods for content delivery based on events at a user terminal.

BACKGROUND

Computer applications, websites, or other electronic content including offers for products and services generally require a user to explicitly select and/or interact with one or more portions of the content being presented to generate a conversion (e.g., completion of a sale or purchase, submission of information to a content provider, causing delivery of additional information to the user or any other pre-defined response for the content). For example, an advertisement for a product or service can require the user to select the advertisement and navigate to the online store offering the product for sale. At the online store, the user can then enter information to purchase or obtain additional information regarding the product or service.

In many types of electronic content maintained by content providers, the portions of the content offering products and services are generally not static. Rather, such (primary) content providers may offer portions, directly or via an agent, for use by one or more other (secondary) content providers. Thus, these portions can vary over time, depending on the arrangement between the primary and secondary content providers.

Typically, content from secondary content providers, such as advertisements, are presented and priced based on some type of arrangement between the primary and secondary content providers. For example, a secondary content provider may pay up front for a number of impressions (i.e., presentations of their advertisement) during a period of time. In another example, the secondary content provider may only pay for the number of times an impression results in a conversion.

Such models are generally based on the premise that advertisements and similar content are effective for generating interest in a product or service only if a conversion results. Unfortunately, consumer behavior can be unpredictable and accordingly a consumer may walk away prior to a conversion. This can occur for any number of reasons, including reasons unrelated to the advertisement. Thus, the existing metrics for determining the effectiveness of electronic campaigns may not accurately reflect the amount of actual interest in the product or service.

SUMMARY

Accordingly, the present technology provides systems and methods for selecting content, such as advertisements, to present to users based on user interactions that fail to generate a conversion. In operation, a content server delivers a content package to a user terminal, where the content package includes content, such as advertisements, designed to elicit a conversion or any other type of pre-defined user response. Upon receiving the content package, the user terminal presents the content to a user and generates a journal of events occurring at the user terminal during display of the content package. The journal is then used to determine the proximity of the events in the journal to the pre-defined response. If the degree of proximity to the pre-defined response is high, it is more likely than not that the user is prepared to complete the conversion and therefore a same or similar content can be selected for a next content package being delivered to the user terminal. Otherwise, new content can be delivered to the user terminal in the next content package.

The degree of proximity can be selected on the basis of a mapping and/or event weight scheme. Based on selected factors, such as an order and a quantity of the events, the events can be mapped to an event weight. The event weights can then be combined to generate a proximity score that indicates the degree of proximity to the desired response. In some configurations, the mapping and scoring can occur completely at a content delivery system serving the user terminal. In other configurations, the mapping and scoring can occur at the user terminal, which then forwards the score to the content server. In either case, the content delivery can thereafter use the score to assemble future content packages for the user terminal.

The present technology also allows for managing electronic campaigns for multiple user terminals. Thus, when the same content package is delivered to multiple user terminals, the next content package for these multiple user terminal can be selected based on the proximity of actions at the various user terminals to the desired response. In one configuration, the aggregate proximity of the user terminals to the desired response can be evaluated by combining individual proximity scores. Thus, if the degree of aggregate proximity to the desired response is high, the same or related content is selected. Otherwise, new content is selected for the user terminals. In another configuration, the user terminals can be sorted into different groups or segments based on their individual proximity to the desired response. Thereafter, content packages for each group can be assembled, based on their relative proximity to the desired event. In either configuration, the content delivery system can be further configured to assemble future content packages based on bidding or premium pricing for targeting these multiple terminals.

DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
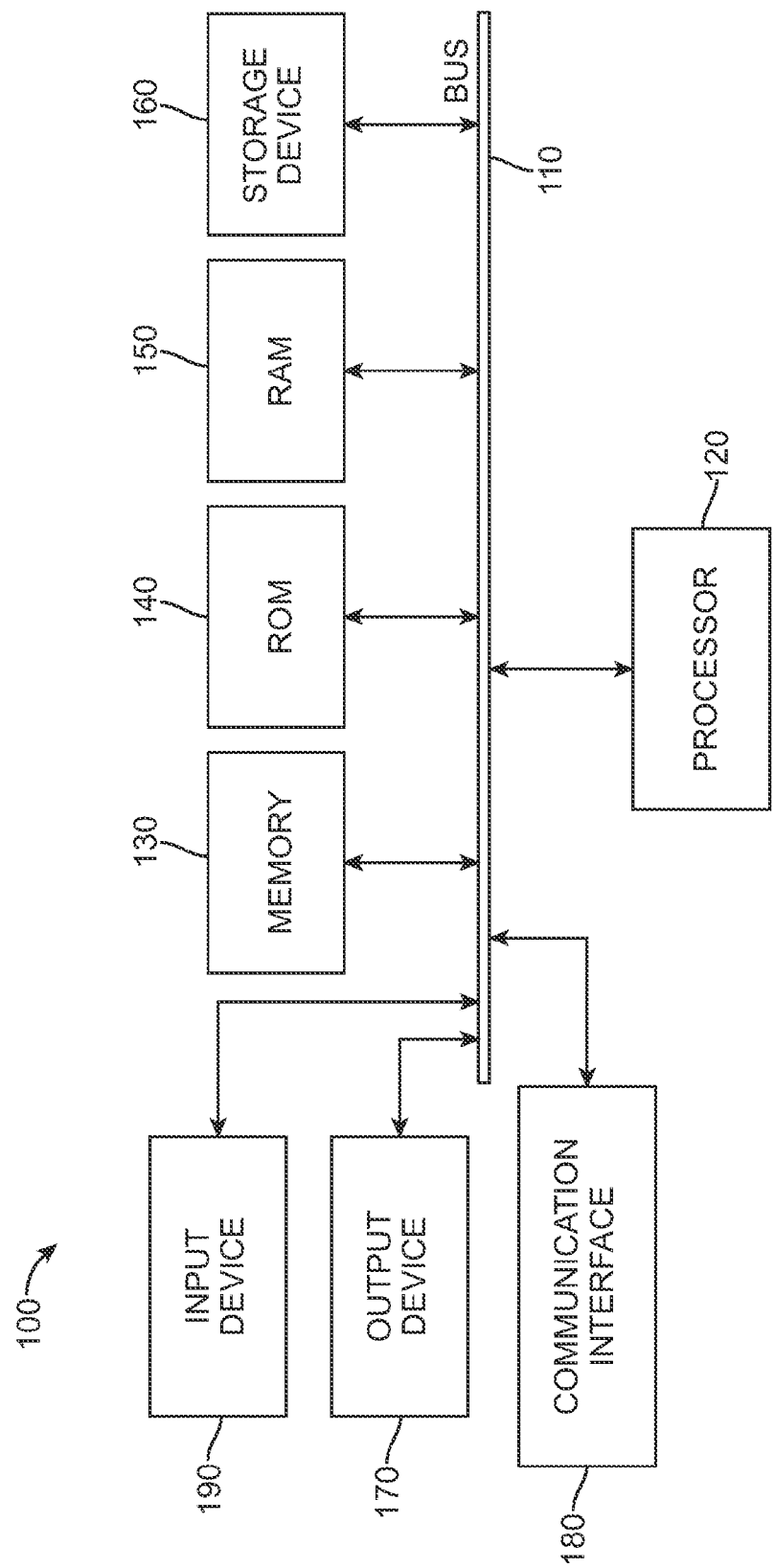
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as including individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
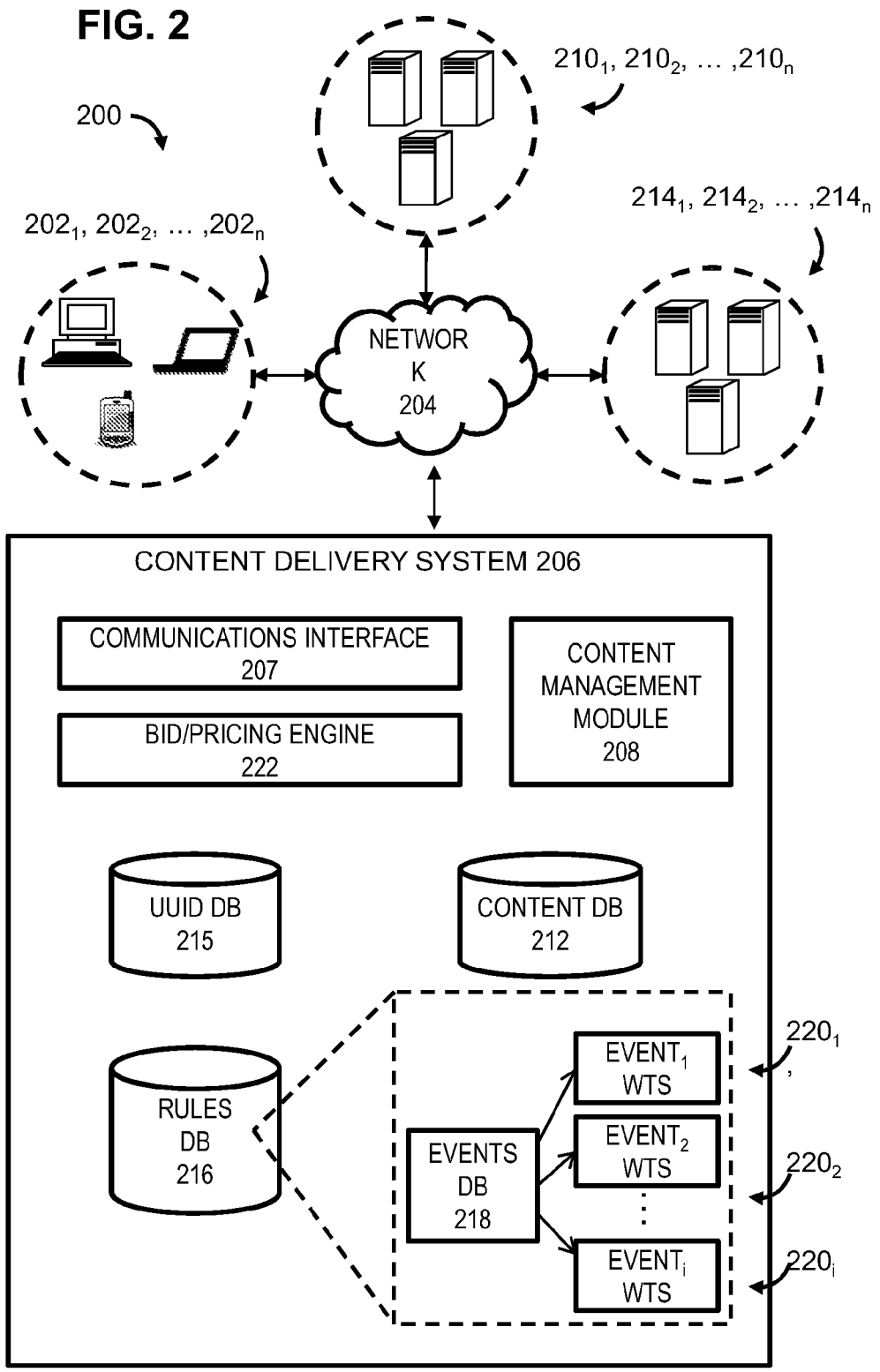
FIG. 2 illustrates an example system embodiment.

The present system and method is particularly useful for delivering a first content package to user terminals and assembling a second content package to deliver to the user terminals based user interactions with the content in the first content package. A system 200 is illustrated in FIG. 2 wherein electronic devices communicate via a network for purposes of exchanging content and other data. In some embodiments, the present system and method are carried out on a local area network such as that illustrated in FIG. 2. However, the present principles are applicable to a wide variety of network configurations that facilitate the intercommunication of electronic devices.

In system 200, a content package is delivered to user terminals $202_1 \ldots 202_n$ (collectively "202") connected to a network 204 by direct and/or indirect communications with a content delivery system 206. In particular, the content delivery system 206 receives a request for an electronic content, such as a web page, from one of user terminals 202. Thereafter, the content delivery system 206 assembles a content package in response to the request and transmits the assembled content package to the requesting one of user terminals 202. The content in the assembled content package can include text, graphics, audio, video, or any combination thereof. Further, the assembled content packages can includes content designed to elicit a pre-defined response from the user and that can vary over time. The content delivery system can include a communications interface 207 to facilitate communications with the user terminals 202 and any other components in system 200.

The content delivery system 206 includes a content management module 208 that facilitates generation of the assembled content package that includes time-varying content, such as an advertisement. Specifically, the content management module can combine content from one or more one or more primary content providers $210_1 \ldots 210_n$ (collectively "210") and content from one or more secondary content providers $214_1 \ldots 214_n$ (collectively "214") to generate the assembled content package for the user terminals 202.

Although, primary and secondary providers 210, 214 are presented herein as discrete, separate entities, this is for illustrative purposes only. In some cases, the primary and secondary providers 210, 214 can be the same entity. Thus, a single entity may define and provide both the static and the time-varying content.

For example, in the case of a web page being delivered to a requesting one of user terminals 202, the content management module 208 can assemble a content package by requesting the data for the web page from one of the primary content providers 210 maintaining the web page. For the time-varying content on the web page provided by the secondary content providers 214, the content management module 208 can request the appropriate data according to the arrangement between the primary and secondary content providers 210 and 214. For example, the content from the secondary provider 214 can be selected based on a guaranteed number of impressions. Alternatively, the content from the secondary provider 214 can also be selected based on the context of the content provided by the primary content provider 210 in the web page. However, any other arrangements and configuration for selecting content from the secondary provider can also be used.

Although the content management module 208 can be configured to request that the data be sent directly from content providers 210 and 214, a cached arrangement can also be used to improve performance of the content delivery system 206 and improve overall user experience. That is, the content delivery system 206 can include a content database 212 for locally storing/caching content maintained by content providers 210 and 214. The data in the content database 212 can be refreshed or updated on a regular basis to ensure that the content in the database 212 is up to date at the time of a request from a user terminal. However, in some cases, the content management module 208 can be configured to retrieve data directly from content providers 210 and 214 if the metadata associated with the data in content database 212 appears to be outdated or corrupted.

In the various embodiments, the content delivery 206 can also include a unique user identifier (UUID) database 215 that can be used for managing sessions with the various user terminal devices 202. The UUID database 215 can be used with a variety of session management techniques. For example, the content delivery system 206 can implement an HTTP cookie or other conventional session management methods (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of mobile devices or other types of user terminals connecting using multiple or non-persistent network sessions, multiple requests for content from such devices may be assigned to a same entry in the UUID database 215. Such an assignment can be provided by analyzing requesting device attributes in order to determine whether such requests can be attribute to a same device. Such attributes can include device or group-specific attributes.

As described above, content maintained by the content providers 210 and 214 can be combined according a pre-defined arrangement between the two content providers, which can be embodied as a set of rules. In an arrangement where the content delivery system assembles the content package from multiple content providers, these rules can be stored in a rules database 216 in content delivery system 206 and content management module 208 can be configured to assemble the content package for user terminals 202 based on these rules. The rules can specify how to select content from secondary content providers 214 and the primary content providers 210 in response to a request from one of user terminals 202. For example, in the case of a web page maintained by one of primary providers 210 and including variable advertisement portions, the rules database 216 can specify rules for selecting one of the secondary providers 214. The rules can also specify how to select specific content from the selected one of secondary providers 214 to be combined with the content provided by one of primary providers 210.

Once assembled, the assembled content package can be sent to a requesting one of user terminals. However, the content package is not limited to the content from content providers 210 and 214. Rather, the content package can include other data generated at the content delivery system 206. In some embodiments, this other data can include code or instructions for generating and/or managing a journal or log of user interactions at the requesting one of user terminals during presentation of the assembled content. For example, the assembled content package can be delivered along with a server-side generated cookie or a server-side generated daemon or other application that generates the journal and delivers the journal back to the content delivery system 206. In another example, the assembled content package can be delivered with instructions for generating a terminal-side cookie or spawning an instance of a terminal-side daemon or other application for generating the journal and delivering the journal back to the content delivery system 206. In some cases, the code or instructions can be embedded within delivered portions of the content in the content package. In yet other embodiments, the user terminals 202 can be configured to automatically generate the journal upon receipt of a content package from the content delivery system 206.

Although generation of the journal can be triggered at the time of delivery and presentation of the content from the delivered content package, in other embodiments the journal generation can be triggered by other events. For example, in some embodiments the journal generation can be triggered at time of the request at the user terminal 202 or upon request or delivery of advertisement second content package to the user terminal. In other embodiments, the journal generation can be triggered based on detection of explicit user input (e.g., as in when the user asks the user terminal to track his current location). Thus, by allowing the generation of the journal to begin prior to presentation of the content from the delivered content package, other data associated with the user terminal can be captured and used to subsequently evaluate the proximity scores for the content. For example, load times and other delays can be used to positively or negatively affect a subsequently computed proximity score, as described below.

Thereafter, the events in the journal can be used to generate scores for assembling a next content package to be delivered to the requesting one of user terminals 202 responsive to a next request. This is described below in greater detail with respect to FIGS. 3 and 4.

Figure 3:
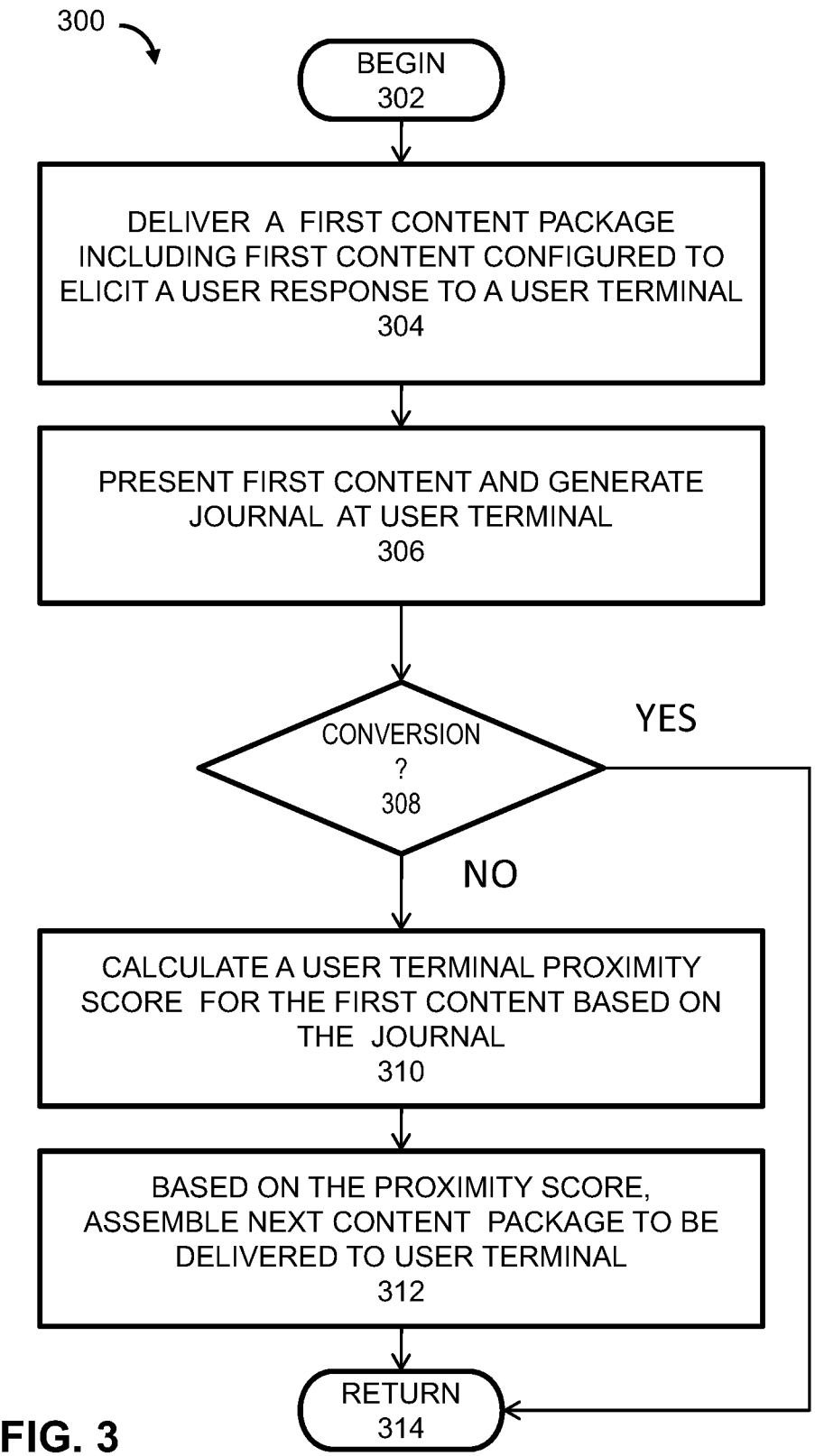
FIG. 3 is a flowchart illustrating a method embodiment for managing content delivery for a user terminal.

FIG. 3 is a flowchart illustrating a method 300 for managing content delivery for a user terminal. Method 300 begins at step 302 and continues on to step 304. At step 304, a first content package is delivered to one of user terminals 202 from content delivery system 206. As described above, this first content package delivered to a user terminal consists of at least a first content designed to elicit a pre-defined response when presented to the user. For example, these portions can include advertisements, forms, or any other type of content specifically designed to require a specific user action or a set of specific user actions to result in a conversion.

After the first content package is delivered to a user terminal at step 304, method 300 proceeds to step 306. At step 306, the user terminal presents the content from the first content package. Concurrently, the user terminal begins to generate a journal of events occurring in response to the first content package, as described above.

For each of these events, the journal can include timestamp information, such as the date, time, and length of the event. Such events can include, for example, actions caused by a user interface device, such as a keyboard or keypad, a mouse or trackball, a touchpad or touch screen, or any other type of device for permitting a user to directly interact with a user terminal, as described above with respect to FIG. 1. In some cases, the occurrence of particular types of events, consisting of a series of sustained or multiple user actions, can be recorded in the journal. For example, in the case of a touch screen interface, events such as swiping, scrolling, taping, pinching, and typing can be recorded as events in the journal. Additionally, the events in the journal can also include user terminal generated events, such as notifications for the user, generation of error messages, or any other type of activity not corresponding to a direct user input. Further, the journal can also record periods of inactivity as events in the journal.

Following step 306, method 300 can determine at step 308 whether or not the journal needs to be used to select a next content for the user terminal. In particular, if a conversion has occurred, the journal may not be needed and method 300 can end and resume previous processing at step 314, including repeating method 300. However, if no conversion has occurred, method 300 proceeds to step 310 to utilize the journal to assemble the next content package.

At step 310, a proximity score for the user terminal is calculated based on the journal. That is, a score that indicates the proximity of the events in the journal to the pre-defined response for a content in the first content package. Calculation of this score will be described below in greater detail with respect to FIG. 4. Once the proximity score is calculated at step 308, the method 300 proceeds to step 312, where the content delivery system 206 assembles, and subsequently delivers, the second content package to the user terminal based on the proximity score.

The proximity score can be used in several ways to assemble the next content package. In one arrangement, the proximity score can be compared to a threshold value or other single proximity score criteria. Thus, if the proximity score exceeds or meets this single criterion, it is indicative that the events in the journal were close to occurrence of a conversion. Accordingly, the content management module 208 can assemble the next content package to include a second content related to the first content the next time the user terminal requests content from the content delivery system 206. For example, the second content can consist of the first content from the first content package. Alternatively, the content management module 208 can select a different content, but closely related to the first content. For example, such content can include content associated with a same electronic campaign, a same provider, or similar goods and services.

In some embodiments, more than one threshold value or proximity score criteria can be specified. For example, at least first and second threshold values can be provided to indicate different levels of proximity. In such an arrangement, if the proximity score exceeds both values, this can indicate a high degree of proximity. Thus, the same or substantially similar content can be selected, as described above. In contrast, if the proximity score falls below both values, this can indicate a low degree of proximity. Thus, different content or content from a different secondary provider should be selected. In the case that the proximity score falls between the two threshold values, this can indicate some degree of proximity. Therefore, related, but different content can be selected. Other threshold values can be specified to provide additional categorization for the user terminal. Once the next content package is selected at step 312, method 300 resumes previous processing at step 314, including repeating method 300.

Figure 4:
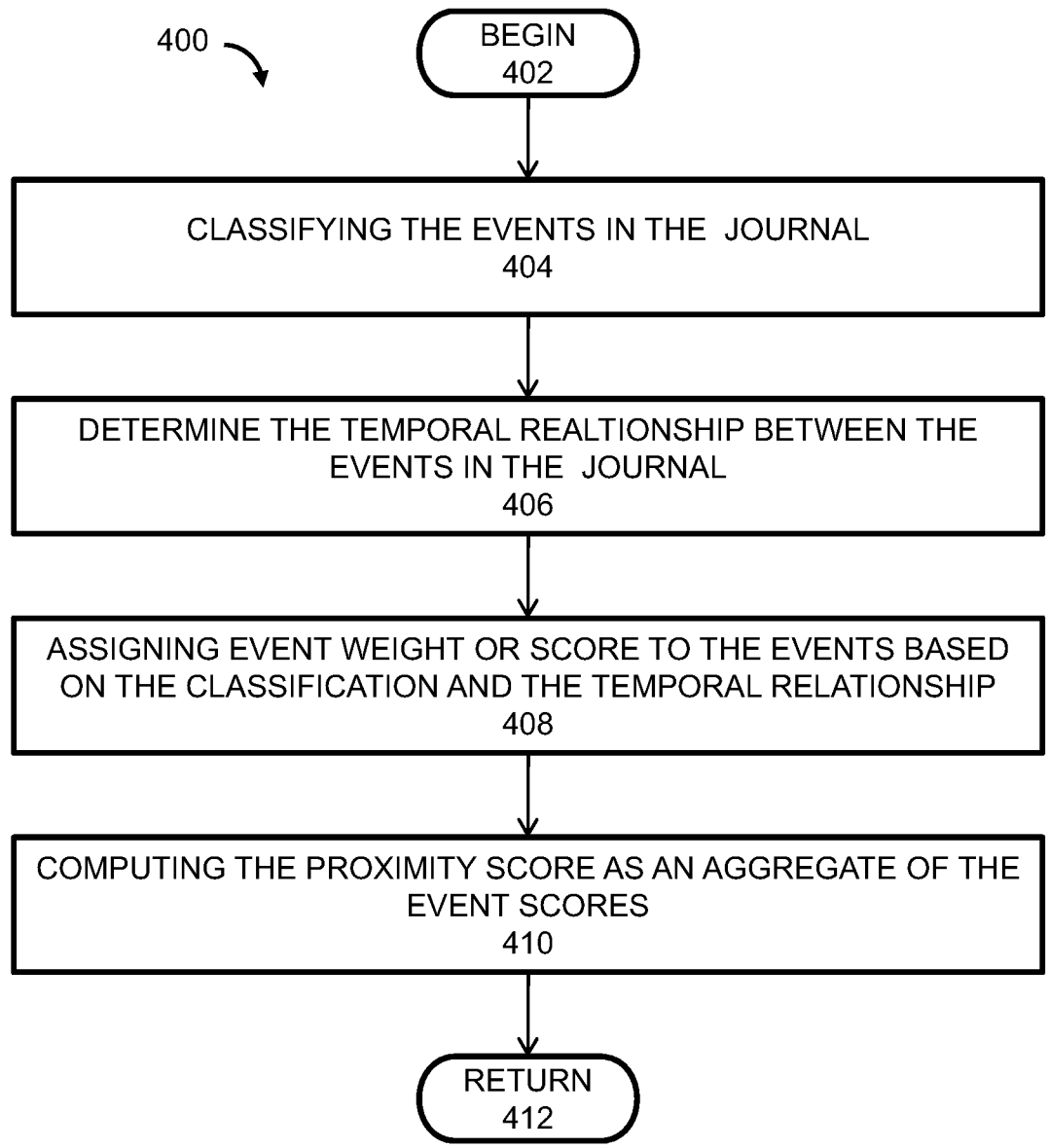
FIG. 4 is a flowchart illustrating a method embodiment for determining proximity scores.

Referring now to FIG. 4, there provided a flowchart illustrating a method 400 for determining proximity scores. Method 400 begins at step 402 and continues to step 404. At step 404, the events in the journal are classified. In the various embodiments, the events in the journal can be classified in a variety of ways. For example, classification can be based on the type of events, a source or origin of the events (i.e., the user, the user terminal, etc. . . . ), and a location of the event (e.g., the portion of the user terminal display or the content presented associated with the event). Thereafter, at step 406, the temporal relationship between the events in the journal can be determined. For example, an order, a relative timing, and/or a number of recurrences of the events can be determined.

Once the events are classified at step 404 and their temporal relationship is established at step 406, each of the events can be associated with an event weight or event score with respect to the first content. Therefore, each event can be mapped to a particular event weight or score based on its classification and relative temporal position in the journal at step 408.

In some embodiments, the event weights can rely at least partially on the type of the event. For example, in the case of a touch screen interface providing a web page with an advertisement, some types of events are commonly associated with a more focused or careful viewing of the web page. Such events can be user actions resulting in magnification of portions of the web page, slower scrolling of the web page, or any other event that could be interpreted as being indicative of the user reviewing the content of the web page more closely. Accordingly, when such events are detected in the journal, a higher event weight can be applied for these events. In contrast, other events can be classified as being associated with a less careful view of the page. Example of such events can include a relatively quick scrolling of the web page or any other user action generally associated with a cursory or superficial inspection of the web page. Accordingly, when such events are detected in the journal, a lower event weight can be applied.

In some embodiments, the event weights can also rely at least partially on a location of the event. For example, in the case of a touch screen interface providing a web page with an advertisement, events classified as occurring within or nearby a portion of the web page including the advertisement can be associated a higher event weight. In contrast, events classified as occurring far from the position of the advertisement in the web page can be associated with a relatively lower event weight. In another example, certain portions of the user interface that display the advertisement can be associated with different weights. Similarly, certain positions around the advertisement can be associated with different weights.

In some embodiments, the event weights can be based on a combination of type and location of one or more events. Some types of events can consist of a series of actions occurring over several portions of the user interface. For example, a cursor motion or a swiping motion on a touch screen device effectively consists of a motion along a series of points in the user interface in one or more directions. In such a configuration, different weights can be applied based on the aggregate of the individual motions. Thus, an aggregate weight can be generated, for example, by combining the weights of the individual actions. Alternatively, a weight can be generated based on a comparison of the motion to one or more references, each associated with a weight. Thus, a weight can be applied that is associated with the reference motion that is closest.

In some embodiments, the event weights can also rely at least partially on a source of the event. In many cases, events occurring on a user terminal consist of user-initiated events, user terminal initiated events, or combinations thereof. In general, an advertisement or other electronic content seeking a response generally requires some level of direct user interaction. Therefore, an event weight can be applied accordingly. For example, a higher event weight can be applied for events primarily initiated by users, depending on the level of user interaction. In contrast, user terminal initiated invents can be associated with lower event weights depending again on the level of user interaction.

As described above, an event weight can also rely on the temporal relationship between the events in the journal. Accordingly, the event weights resulting from the classification process can be adjusted in response the temporal relationship of the events. For example, a specific order or sequence of events can be associated with completion of a conversion. Thus, if the events in the journal indicate that a portion of the sequence has been completed, the events associated with this sequence can be provided a higher event weight. Additionally, the event weight can be further adjusted based on the portion completed. That is, the event weight can be proportional to the portion of the sequence that has been completed.

Similarly, the timing of the events can also affect the event weights. That is, even if a sequence of events associated with partially completing a conversion is detected in the journal, the separation in time between the events can be so great that it is more likely that not that the sequence was not associated with a user seeking to complete a conversion. Similarly, even if a sequence of events was detected in the journal, the inclusion of one or more additional events therebetween can affect the event weights. For example, if such intervening events are primarily user-initiated, this can be associated with an immediate lack of interest in the content and thus a lower event weight should be applied. In contrast if such events are user terminal initiated, this indicates that the user may still be interest, but was interrupted by other, external factors. Thus, the significance of these intervening events is lower and thus a higher event weight can be applied.

Additionally, the recurrence of events (or lack thereof) can affect the event weights. For example, if a web page is presented at the user terminal and the user scrolls up and down repeatedly, this recurrence can be associated with a higher event weight. In contrast, if the web page is presented and the user scrolls down and does not continue on to scroll back and forth, this lack of recurrence can be associated with a lower event weight. In another example, recurring events can be associated with a lower event weight if they are part of a typical user interaction with an electronic content. For example, in the case of a mobile device, repeatedly scrolling and zooming as a web page is example can be a typical user interaction that does not necessarily correspond to a conversion. Thus, a lower event weight can be applied for such types of recurrences.

Further, weights can be generated via a mathematical function that is based on some original weights, but which then generates a function that can generate a new weight, depending on certain conditions, such as order/sequence, type of actions, content or user metadata that provide context in which these actions have been performed.

Referring back to FIG. 4, once the event weights for the events are completed at step 408, the event weights can be aggregated or combined at step 410 to determine a proximity score. Such a computation can occur in a variety of ways. For example, the proximity score can be a statistical measure of the event weights, such as the mean, the median, or the mode of the event weights. However, any other methods for combining or evaluating the event weights or distributions thereof can be used. Once the proximity score for the journal (i.e., the score for the user terminal) is determined at step 410, the method 400 resumes previous processing at step 412. Such processing can include repeating method 400 for other journals or performing and/or completing any other methodologies and processes described herein.

In the various embodiments, the location where proximity scores are calculated can vary. In some embodiments, the proximity scores can be calculated at the content delivery system 206. In other embodiments, the proximity scores can be calculated at the user terminals 202.

In the case of computing the proximity scores at the content delivery system 206, the user terminals 202 can be enabled to transmit the journal to the content delivery system 206. The journal can be delivered to the content delivery system 206 in several ways. For example, the journal can be received as part of a data package consisting of a subsequent request for the content delivery system 206. Alternatively, the user terminals 202 can be configured to automatically generate and deliver a data package including the journal to the content delivery system 206 if a next request is being directed to different content delivery than the one providing the first content. The precise timing and format for the journal and/or the data package can be specified in the code or instruction associated with the content delivered to the user terminals 202 or can be pre-defined for the user terminals.

Upon receipt of the journals from the user terminals 202 the proximity scores can be computed by content management module 208 based on the rules database 216. In particular, the rules database 216 can be configured to include an events database 218, as shown in FIG. 2, listing the various types of events that can be scored. Further, the rules database 216 can include, separately or in combination with events database 218, a set of content event weights $220_1 \ldots 220_i$ that specify the mapping for the events in events database 218 to event weights. In operation, the content management module 208 can first parse the journal to identify the events therein. Thereafter, scores can be associated these events according to the rules database 216 and the content management module 208 can generate the proximity score for the journal.

In the case of computing the proximity scores at the user terminals 202, the process is similar to the one described above for the content delivery system 206. Thereafter a data package, including the journal and/or the proximity score, can be assembled and delivered to the content delivery system. However, in such configurations the user terminals 202 would need to locally store or have remote access to the events database 218 and the associated content event weights $220_1 \ldots 120_i$. Although such a configuration requires performing the mapping of event weights and computation of proximity scores at the user terminal devices 202, such a configurable can be more desirable from a privacy standpoint. That is, since only proximity scores are transmitted from the user terminals to the content delivery system, little or no information is exchanged about particular events occurring at the user terminals 202. As with delivery of the journals to the content delivery system 206, the precise timing and format for the proximity scores can be specified in the code or instruction associated with the content delivered to the user terminals 202 or can be pre-defined for the user terminals.

As described above, in addition to selection of future content for the user terminals 202, the content delivery system 206 can also be used to manage and evaluate electronic campaigns. This is described below with respect to FIGS. 5, 6, and 7.

Figure 5:
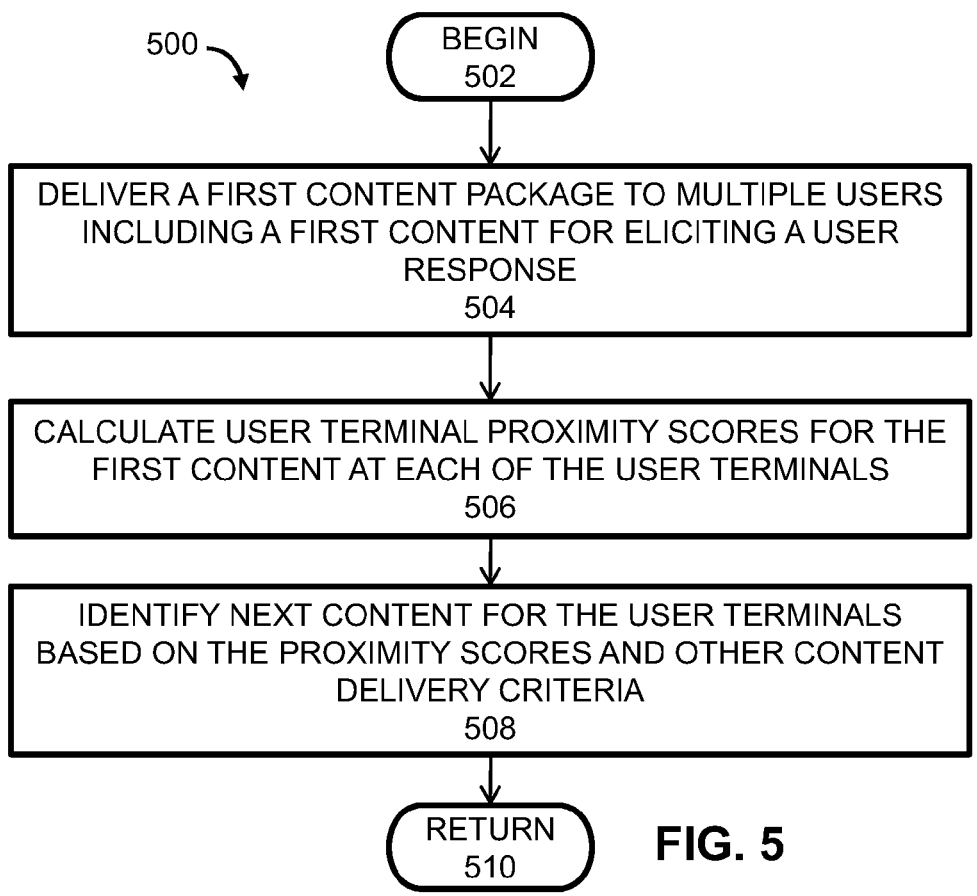
FIG. 5 is a flowchart illustrating a method embodiment for managing electronic campaigns for multiple user terminals.

FIG. 5 is a flowchart illustrating a method 500 for managing electronic campaigns for multiple user terminals. The method 500 begins at step 502 and continues to step 504. At step 504, a substantially similar or related first content package is delivered by the content delivery system 206 to multiple ones of the user terminals 202. For example, a same advertisement is delivered to all of the user terminals 202. However, the first content delivered to each of the user terminals 202 need not be identical. Rather, as in a typical electronic campaign, several types of advertisements can be generated that are for the same or related goods and services. Thus, each of the user terminals 202 can receive a content package that includes content from a same electronic campaign, but that varies from user terminal to user terminal.

Once the first content package is delivered at step 504, the proximity scores for the user terminals 202 receiving this first content package can be determined at step 506. In particular, these scores can be based on the journals generated by each of the user terminals 202. The proximity scores for each user terminal can be generated as described above with respect to FIG. 4. Further, the proximity scores can also be generated at the content delivery system 206 or the user terminals 202, as also described above. Thereafter, the scores can be used to assemble subsequent content packages for the user terminals at step 508, by performing an evaluation based on content delivery criteria. Exemplary embodiments of such evaluations are described below with respect to FIGS. 6 and 7. Once the next content packages for the user terminals are assembled and subsequently delivered, method 500 can resume previous processing at step 510, including repeating method 500 or any other methods described herein.

Figure 6:
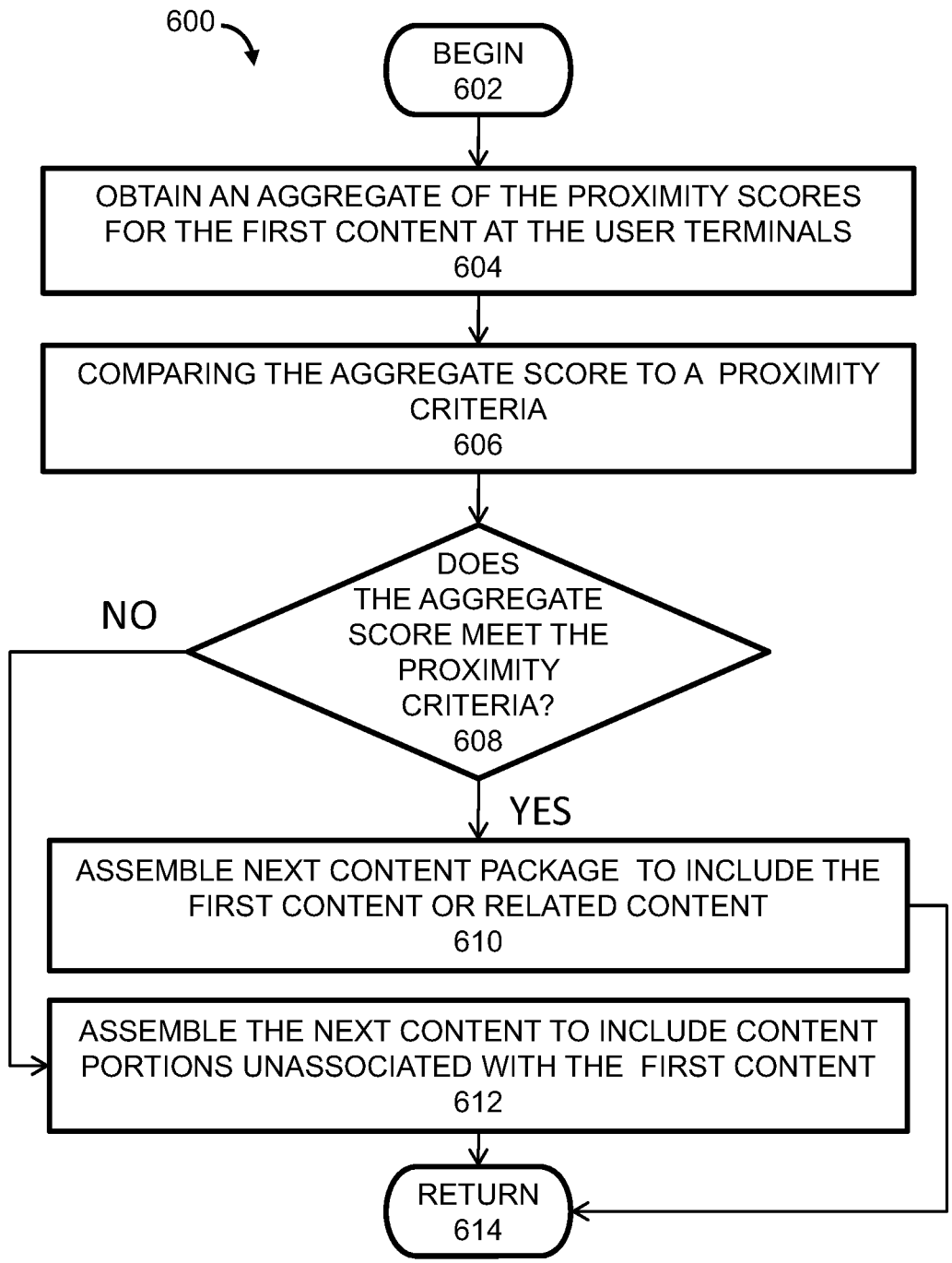
FIG. 6 is a flowchart illustrating a method embodiment for assembling a next content package for user terminals based on aggregate behavior at the user terminals.

As described above, evaluation of proximity scores, for purposes of managing an electronic campaign, can be performed in several ways. One method is to combine the various scores to identify content for future content packages, as shown in FIG. 6. FIG. 6 is a flowchart illustrating a method 600 for assembling a next content package for user terminals based on an aggregate behavior at the user terminals. Method 600 begins at step 602 and continues on to step 604. At step 604, an aggregate of the various proximity scores from the user terminals for the same or similar content is generated by the content management module 208. Such a computation can occur in a variety of ways. For example, a statistical measure of the various proximity scores can be generated, such as the mean, the median, or the mode of the scores. However, any other methods for combining or evaluating the scores or distributions thereof can be used.

Once the aggregate score is obtained at step 606, the aggregate score can be compared to at least one proximity criteria, such as a threshold value or other criteria indicating a level of proximity to a conversion. Thereafter, if the aggregate score meets the criteria at step 608, this score can be indicative of a large amount of interest in the goods and services associated with the campaign. Therefore, method 600 can proceed to step 610 where the next content package is assembled to include the same content, substantially similar content, or related content with the expectation that a user will complete a conversion when the content is presented again. In contrast, if the aggregate score fails to meet the criteria at step 608, this can be indicative of a general lack of interest in the goods and services associated with the campaign. In such an instance, method 600 can instead proceed to step 612, where the next content package is assembled to include new or unrelated content or content from a different or revised electronic campaign. The method can thereafter end at step 614 and resume previous processing.

Figure 7:
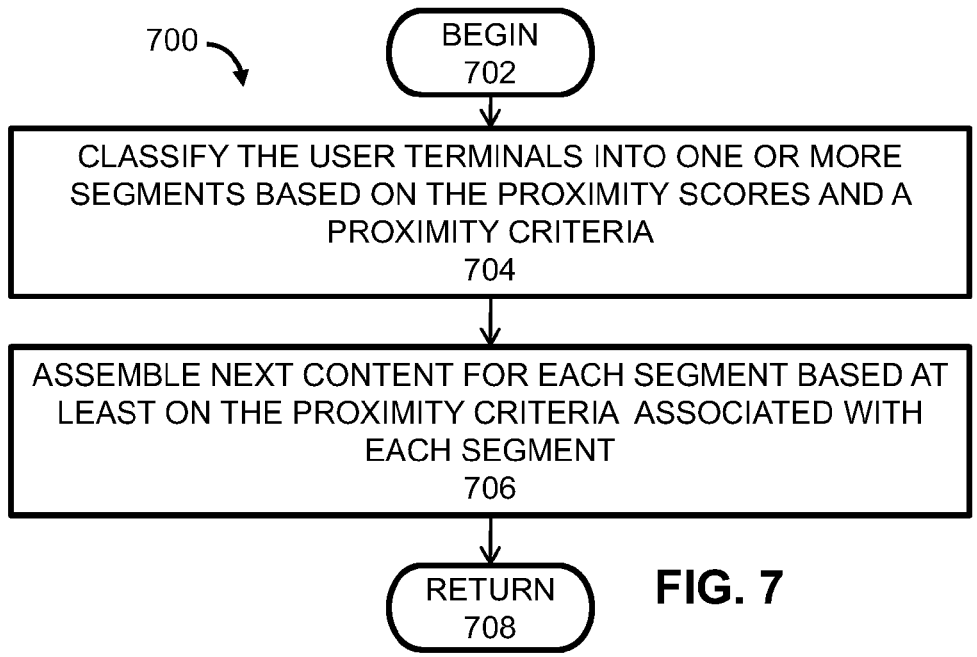
FIG. 7 is a flowchart illustrating a method embodiment for selecting a next content package for user terminals based on segmentation of the user terminals.

Another method to manage the electronic campaign is to use the various proximity scores for segmentation, as shown in FIG. 7. FIG. 7 is a flowchart illustrating a method embodiment for selecting a next content for user terminals based on segmentation of the user terminals 202. Method 700 can begin at step 702 and proceed to step 704. At step 704, the user terminals 202 can be classified into one or more segments based on their individual proximity scores. This classification can be based on one or more threshold values or other proximity criteria. For example, if a single threshold value is specified, two groups or segments can be defined: (1) user terminals with proximity scores less than or equal to the threshold value and (2) user terminals with proximity scores greater than the threshold value. However, any number of threshold values or other criteria can be specified to define the number of groups.

After the segments are defined at step 704, the next content can be assembled for the user terminals at step 706. In particular, a next content package can be assembled for each segment of user terminals based on range of proximity scores associated with each segment. Thus, segments associated with higher proximity scores can be associated with a higher degree of proximity. Thus, the same or substantially similar content can be selected for user terminals in this segment. In contrast, segments associated with lower proximity scores can be associated with a lower degree of proximity. Thus, different content or content from a different secondary provider should be selected. In the case that additional segments are defined in which intermediate proximity scores are defined, the content for these scores can be selected based on the relative values of these proximity scores. The method can thereafter end at step 708 and resume previous processing.

Since the methods described herein are essentially generating leads and identifying potential customers for the goods and services advertised in the content, a bidding or premium pricing process can be used in conjunction with the various method described above to generate additional revenues for an operator of a content delivery system. Accordingly, referring back to FIG. 2, the content delivery system 206 can further include a bid/pricing engine 222 for facilitating such processes. In such cases, the content management module 208 is configured to select content using the engine 222. That is, rather than automatically assemble a next content package by selecting the next content from one of the secondary providers 214 and thereafter bill the presentation of the next content according to the agreement between the primary and secondary providers, the engine can identify such a presentation as having a higher value. Thus, the engine 220 can configured to either change the pricing for delivery of the content in the next content package to the identified user terminals. Alternatively, the engine can send a request for bids to various content providers offering the same goods or services and provide content in the next content package from the highest bidding content provider. Thus, the engine 222 facilitates the generation of additional revenue for the content delivery system 206.

Although the various embodiments described above are directed at basing the delivery of future content based on a currently computed proximity score, proximity scores from the same user can be aggregated. For example, in one embodiment, the content delivery system 206 can be configured to store proximity scores for the content previously delivered to the user. Thus, when a proximity score is obtained for a current content, this score can be compared to previous proximity scores for the same or similar content. As a result, an aggregate proximity score can be generated, which can be used to more accurately estimate a user's interest in the content.

Alternatively or in combination with such aggregation, the current journal can be compared to a past journal to identify outliers. For example, a first journal is obtained for a user terminal that results in a high proximity score that indicates a high interest in the content already delivered, triggering delivery of a same or similar content to the user terminal. A subsequent journal obtained for this delivered content may result in a low proximity score, indicating a low interest in this related content. However, rather than automatically triggering delivery of a new content, the past and current journals can be first compared. Thus, if significant differences in events between the journals are discovered, this can confirm the low interest and the low proximity score. However, if the differences between the events in the journal are minor or are considered to be irrelevant with respect to a user's interest, the low proximity score can be considered an outlier and thus can be boosted prior to selection of a next content. For example, the events driving the low score can be removed and the proximity score can be recomputed to obtain a boosted proximity. In another example, the current proximity score can be averaged or otherwise combined with a prior proximity score to provide the boosted proximity score. Such operations can be performed on the content delivery system or a user terminal.

In some embodiments, the journals and proximity scores can be used to enhance a user experience at the user terminal without the need to communicate with the content delivery system. For example, in some configurations, a user terminal can receive a collection of content to present to the user. Accordingly, based on a proximity score when one of this collection content is presented, the user terminal device can determine which of these locally stored content to present. That is, the user terminal can determine whether to not present the content again or wait an extended period of time before presenting the content again (if a low proximity score is obtained), immediately present the content again (if a high proximity score is obtained), or present the content again in a short period of time (if an intermediate proximity score is obtained). Any scores obtained can be compared to proximity criteria, such as threshold values or other measures of proximity described above. Alternatively, the proximity score can be used to select a specific one of the collection of content to present. In such a configuration, a proximity score for each of the collection can be computed and a highest score can be used to select the next of the collection to present.

Other implementations according to these examples include computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A method comprising:
    sending, by a processor, a first content package to a user terminal, the first content package including a first content designed to elicit a pre-defined response from a user of the user terminal;
    receiving, by the processor, a first data package from the user terminal, the first data package comprising a journal of events performed on the user terminal by the user of the user terminal in response to the first content;
    calculating, by the processor, a proximity score based on the journal of events, the proximity score indicating a proximity of the events performed by the user in response to the first content to the pre-defined response elicited by the first content; and
    assembling, by the processor, a second content package for the user terminal, wherein the second content package includes a second content related to the first content when the proximity score meets a first proximity score criteria for the first content.

2. The method of claim 1, wherein the assembling further comprises selecting the second content to be the first content.

3. The method of claim 1, wherein calculating the proximity score comprises:
    providing a classification for the events in the first journal;
    determining a temporal relationship among the events in the first journal; and
    computing the proximity score based on at least the classification and the temporal relationship.

4. The method of claim 3, wherein providing the classification comprises identifying a type, a source, and a location for the events in the first journal.

5. The method of claim 3, wherein determining the temporal relationship comprises identifying an order, a timing, and a recurrence of the events in the first journal.

6. The method of claim 1, wherein the assembling of the second content package further comprises:
    providing a plurality of content for the second content package, each of the plurality of content associated with a proximity score value with respect to the first content; and selecting for the second content package at least one of the plurality of content corresponding to the proximity score.

7. The method of claim 1, wherein the assembling further comprises:
providing a plurality of groups of content for the second content package, the plurality of groups associated with a plurality of proximity score criteria with respect to the first content;
comparing the proximity score to the plurality of proximity score criteria; and
selecting content for the second content package from a one of the plurality of groups associated with a one of the plurality of proximity score criteria met by the proximity score.

8. A non-transitory computer-readable medium having code for causing a computer to perform a method stored thereon, the method comprising:
sending a first content package to one or more user terminals, the first content package comprising a first content designed to elicit a pre-defined response from a user of each of the one or more user terminals;
storing one or more data packages received from the user terminals in response to the first content package, each of the data packages comprising a proximity score indicating a proximity of the events performed by the user of the user terminal from which the data package was received to the predefined response elicited by the first content of the first content package; and
assembling at least one second content package for the user terminals, wherein the second content package includes a second content related to the first content when the proximity score associated with the one of the user terminals meets a first proximity score criteria for the first content.

9. The non-transitory computer-readable medium of claim 8, wherein the step of assembling further comprises:
generating an aggregate proximity score for the user terminals;
comparing the aggregate proximity score at least one of a plurality of proximity score criteria with respect to the first content; and
selecting at least one content for the second content package from a plurality of content associated with a one of the plurality of proximity score criteria met by the aggregate proximity score.

10. The non-transitory computer-readable medium of claim 8, wherein the step of assembling further comprises:
categorizing the user terminals into one or more segments according to the proximity score associated with each of the user terminals and at least one proximity score category criteria with respect to the first content; and
assembling the second content package for each segment to including at least one of a plurality of content associated with each of the segments.

11. A content delivery system, comprising:
a communications interface configured for sending a content package to a user terminal and receiving a data package from the user terminal, wherein the content package includes a first content designed to elicit a pre-defined response from a user of each of the at least the user terminal and the data package comprising a dataset associated with events at the user terminal in response to the first content; and a content management module for assembling a next content package for the user terminal based on the received data package, wherein the content management module is configured for:
determining from the received data package a proximity score indicating a proximity of the events to the pre-defined response elicited by the first content, and
assembling the next content package based on the proximity score, wherein the next content package includes a second content related to the first content when the proximity score meets a first proximity score criteria for the first content.

12. The system of claim 11, wherein the dataset comprises a journal of the events, and wherein the content management module is configured for calculating the proximity score based on the journal.

13. The system of claim 12, wherein content management module is further configured for calculating the proximity score based on a classification of the events in the journal and a temporal relationship among the events in the journal.

14. The system of claim 13, wherein content management module classifies the events in the journal by identifying a type, a source, and a location for the events in the journal and determines the temporal relationship among the events based on an order, a timing, and a recurrence of the events in the journal.

15. The system of claim 11, wherein the content management module is further configured during the assembling for:
responsive to receiving a plurality of data packages from a plurality of terminals in response to the previous content package, generating an aggregate proximity score for the plurality of user terminals and assembling the next content package for the plurality of terminals based on the aggregate proximity score.

16. The system of claim 11, wherein the content management module is further configured during assembling for:
responsive to receiving a plurality of data packages from a plurality of terminals in response to the previous content package, categorizing the plurality of user terminals into one or more segments based an associated proximity score and at least one proximity score criteria with respect to the previous content package, and selecting content for the next content package for each of the segments from a plurality of content associated with each of the segments.

17. The system of claim 11, further comprising:
a bidding/pricing engine for requesting an alternate pricing for delivery of the second content.

18. A method comprising:
receiving, by a user terminal, a first content package including a first content designed to elicit a pre-defined response;
generating, by the user terminal, a journal of events occurring during presentation of the first content package at the user terminal;
computing a proximity score indicating a proximity of the events in the journal to the pre-defined response elicited by the first content;
assembling a data package in response to the content package, the data package comprising the proximity score; and
sending the data package to a source of the first content package.

19. The method of claim 18, wherein the data package further comprises the journal.

20. The method of claim 18, wherein the computing further comprises:

providing a classification for the events in the journal;
determining a temporal relationship among the events in the journal; and
computing the proximity score based on the classification and the temporal relationship.

21. The method of claim 20, wherein providing the classification comprises identifying a type, a source, and a location for the events in the journal.

22. The method of claim 20, wherein determining the temporal relationship comprises identifying an order, a timing, and a recurrence of the events in the journal.

23. The method of claim 18, further comprising:
prior to the step of assembling, comparing the proximity score to at least one other proximity score associated with another content previously presented at the user terminal and associated with the first content, and adjusting the proximity score if the proximity score is determined to be an outlier.

24. A user terminal, comprising:
a communications interface for receiving a content package, the content package including a first content designed to elicit a pre-defined response from a user of the user terminal;
at least one user interface for receiving a user input; and
a processing element communicatively coupled to the user interface and the communications interface, the processing element configured to:
present the content package at the user interface,
generate a journal of events for the content package, the journal including input received by the user interface in response to the presented first content, and
compute a proximity score, the proximity score indicating a proximity of the events to the pre-defined response elicited by the first content of the content package.

25. The user terminal of claim 24, wherein the processing element is further configured to:
assemble a data package in response to the content package, and
cause the communications interface to send the data package to a source of the content package, wherein the assembled data package comprises at least one of the journal and the proximity score.

26. The user terminal of claim 24, wherein the processing element generates the proximity score based on a classification of the events in the journal and a temporal relationship among the events in the journal.

27. The user terminal of claim 24, wherein the content package comprises a plurality of content for presenting at different times at the user interface, and wherein the processing element is further configured to:
generate the proximity score based on a currently presented content of the plurality of content, and selecting a next presented content of the plurality of content based on the proximity score.

28. The user terminal of claim 27, wherein the processing element is further configured to:
select a currently presented content as the next presented content if the proximity score meets a proximity score criteria for the currently presented content.

29. The user terminal of claim 27, wherein the processing element is further configured to:
exclude a currently presented content as the next presented content if the proximity score meets a proximity score criteria for the currently presented content.

* * * * *